(12) United States Patent
Asano et al.

(10) Patent No.: US 8,055,031 B2
(45) Date of Patent: Nov. 8, 2011

(54) AUTHENTICATION DEVICE

(75) Inventors: Eisuke Asano, Nagoya (JP); Tsukasa Yasue, Nagakute (JP)

(73) Assignee: Hitachi-Omron Terminal Solutions, Corp., Tokyo (JP)

( * ) Notice: Subject to any disclaimer, the term of this patent is extended or adjusted under 35 U.S.C. 154(b) by 985 days.

(21) Appl. No.: 12/003,513

(22) Filed: Dec. 26, 2007

(65) Prior Publication Data

US 2008/0192989 A1 Aug. 14, 2008

(30) Foreign Application Priority Data

Feb. 8, 2007 (JP) ................................. 2007-029231

(51) Int. Cl.
*G06K 9/00* (2006.01)
(52) U.S. Cl. ........................................................ 382/124
(58) Field of Classification Search .......... 382/124–127; D14/441
See application file for complete search history.

(56) References Cited

U.S. PATENT DOCUMENTS

| 3,804,524 A * | 4/1974 | Jocoy et al. ................. 356/138 |
| 6,349,227 B1 * | 2/2002 | Numada ........................ 600/310 |
| 2002/0028004 A1 * | 3/2002 | Miura et al. .................. 382/124 |
| 2002/0110266 A1 * | 8/2002 | Teng et al. ................... 382/127 |
| 2003/0002717 A1 | 1/2003 | Hamid |
| 2004/0175023 A1 | 9/2004 | Svedin et al. |
| 2004/0183652 A1 | 9/2004 | Deng et al. |

FOREIGN PATENT DOCUMENTS

| EP | 1 434 162 A | 6/2004 |
| JP | 02-064764 | 3/1990 |
| JP | 2005-194820 | 7/2005 |
| WO | WO 2006/071061 A1 | 7/2006 |

OTHER PUBLICATIONS

Extended European Search Report issued in European Patent Application No. EP 07024001.5-2211, dated May 16, 2008.

* cited by examiner

*Primary Examiner* — Alex Liew
(74) *Attorney, Agent, or Firm* — McDermott Will & Emery LLP (57) ABSTRACT

An authentication device enabling access from multiple directions, comprises a biometric information acquirer that acquires biometric information from a biometric target; a detector that detects direction of access by the biometric target; a memory that stores in advance therein a template for authentication; and an authenticator that authenticates the biometric target on the basis of the detected access direction information of the biometric target, biometric information acquired from the biometric target, and the template. The authenticator performs authentication using access direction information for the biometric target by carrying out conversion of acquired biometric information or the template, so that the access direction at the time of biometric information acquisition matches the access direction at the time the authentication template was acquired.

10 Claims, 7 Drawing Sheets

⇩ GENERATE BIOMETRIC INFORMATION

Fig.6(B)

⇨ EXTRACTION

BRANCH POINTS
D2,E3,···,F2,G4

END POINTS
D3,D5,···,G5,G6

⇩ ROTATION PROCESS $$\begin{pmatrix} X \\ Y \end{pmatrix} = \begin{pmatrix} \cos\theta & -\sin\theta \\ \sin\theta & \cos\theta \end{pmatrix} \begin{pmatrix} x \\ y \end{pmatrix}$$

Fig.6(C)

BRANCH POINTS
G7,F6,···,E8,D5

END POINTS
D3,D4,···,G4,G6

BRANCH POINTS
D5,E7,E8···

END POINTS
D3,D4,D7···

BRANCH POINTS
D2,E3,E4···

END POINTS
D3,D5,D7···

AUTHENTICATION DEVICE

CROSS REFERENCE TO RELATED APPLICATIONS

The present invention claims priority from Japanese Application JP2007-029231 filed on Feb. 8, 2007, the content of which is hereby incorporated by reference into this application.

BACKGROUND OF THE INVENTION

The technical field relates to an authentication device for locking and unlocking a door using biometric authentication.

Known devices for entry/exit management using biometric information include a device having authentication devices on both the inside and outside of a door; or a device having an authentication device limited to a single location and adapted to be physically rotated so as to enable use from both the inside and outside of a door.

SUMMARY OF THE INVENTION

However, a problem with a device having authentication devices on both the inside and outside of a door is that two authentication devices will be needed for one door, making the authentication device expensive. A problem with a device in which the authentication device is physically rotated is that a drive section will be necessary for rotating the device, making the authentication device more bulky.

In order to address the aforementioned problems at least in part, it is an object of the present invention to provide an authentication device capable of authentication regardless of the direction of access by the biometric target.

The authentication device which pertains to a first embodiment of the present invention is an authentication device enabling access from multiple directions, comprising: a biometric information acquirer that acquires biometric information from a biometric target; a detector that detects direction of access by the biometric target; a memory that stores in advance therein a template for authentication; and an authenticator that authenticates the biometric target on the basis of the detected access direction information of the biometric target, biometric information acquired from the biometric target, and the template. According to the authentication device which pertains to the first embodiment of the present invention, the access direction of a biometric target is detected, and on the basis of access direction, biometric information acquired from the biometric target is matched with a template. As a result, authentication is possible with a single authentication device irrespective of the access direction of the biometric target. A more inexpensive authentication device may be achieved as well.

In the authentication device pertaining to the first embodiment of the present invention, in preferred practice the authenticator will perform authentication using access direction information for the biometric target by carrying out conversion of acquired biometric information or the template, such that access direction at the time of acquisition of the template and access direction of the biometric target at the time of authentication are brought into correspondence. According to the authentication device pertaining to the first embodiment of the present invention, conversion of either the acquired biometric information or the template is performed such that access direction at the time of acquisition of the template and access direction of the biometric target at the time of authentication are brought into correspondence, whereby authentication can be accomplished with a single authentication device irrespective of the access direction of the biometric target. A more inexpensive authentication device may be achieved as well. Furthermore, since there is no need to rotate the authentication device per se, the authentication device can be smaller.

In the authentication device pertaining to the first embodiment of the present invention, in preferred practice the memory stores multiple template information depending on access direction; and from the memory the authenticator will read a template of access direction which corresponds to the access direction of the biometric target from among the multiple templates, and authenticate the biometric target. According to the authentication device pertaining to the first embodiment of the present invention, authentication time can be shorter, since conversion of biometric information or the template is not performed.

In the authentication device pertaining to the first embodiment of the present invention, in preferred practice there will be provided an immobilizer that immobilizes the biometric target at the measurement location. According to the authentication device pertaining to the first embodiment of the present invention, since the measurement location is fixed, data shift is unlikely to occur when biometric information is being created, thus facilitating matching with the templates.

In the authentication device pertaining to the first embodiment of the present invention, in preferred practice there will further be provided a detector that detects the direction of insertion of a biometric target into the immobilizer. According to the authentication device pertaining to the first embodiment of the present invention, since the detector is provided for detecting the direction of insertion of a biometric target into the immobilizer, there is no need to provide other additional detector that detects biometric target access direction. Consequently, a lower cost authentication device may be achieved.

In the authentication device pertaining to the first embodiment of the present invention, in preferred practice there will further be provided an access door for the biometric target; and an access door opening/closure detector. According to the authentication device pertaining to the first embodiment of the present invention, since an access door opening/closure detector is provided, there is no need to provide other additional detector that detects biometric target access direction. Consequently, a lower cost authentication device may be achieved.

In the authentication device pertaining to the first embodiment of the present invention, in preferred practice there will further be provided access preventer that prevents access by a biometric target from a different direction once the biometric target has accessed from a first direction. According to the authentication device pertaining to the first embodiment of the present invention, simultaneous access by two biometric targets can be avoided.

The authentication device which pertains to a second embodiment of the present invention is an authentication device enabling access from multiple directions, comprising: a biometric information acquirer that acquires biometric information from a biometric target; a memory that stores in advance therein multiple templates for authentication purposes depending on access direction; and an authenticator that authenticates the biometric target on the basis of comparison of biometric information acquired from the biometric target with the multiple templates for authentication purposes stored in the memory. According to the authentication device which pertains to the second embodiment of the present invention, multiple templates for authentication purposes depending on access direction are employed, whereby authentication of a biometric target is possible with a single authentication device irrespective of the access direction of the biometric target. Since the detector that detects access direction of biometric target is not provided, lower cost may be achieved as well.

BRIEF DESCRIPTION OF THE DRAWINGS

Preferred embodiments of the present invention will now be described in conjunction with the accompanying drawings, in which.

DESCRIPTION OF THE PREFERRED EMBODIMENTS

Figure 1:
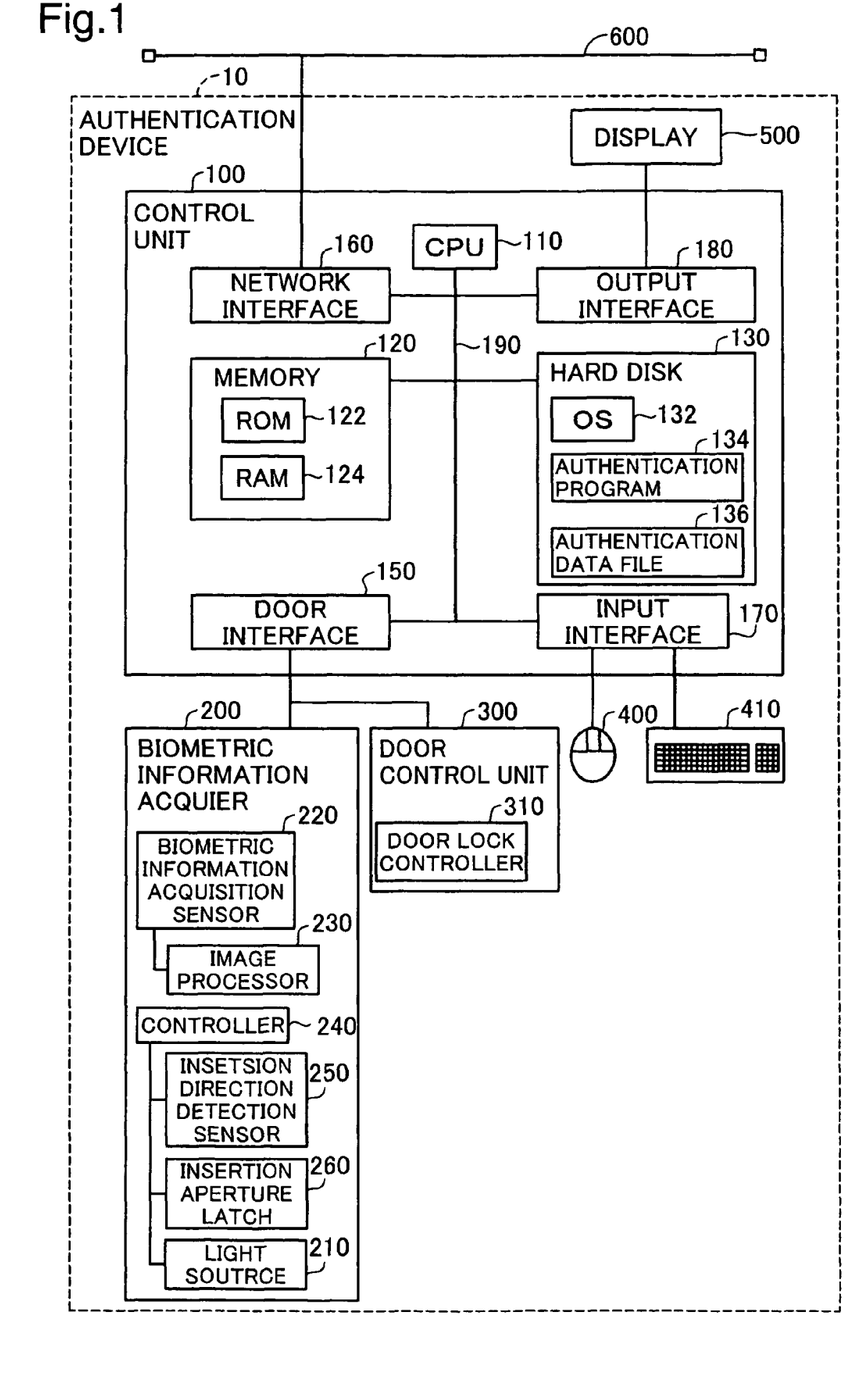
FIG. 1 is a block diagram of an authentication device pertaining to an embodiment.
Figure 2A:
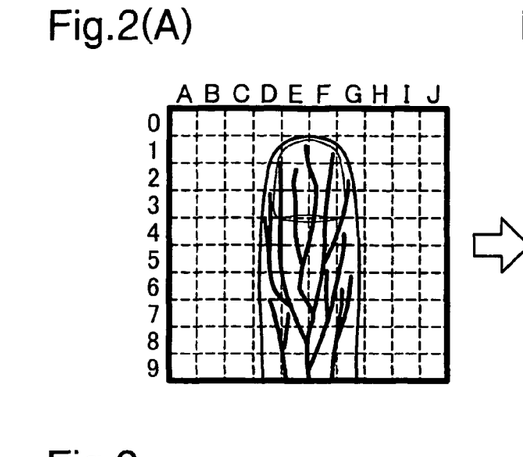
FIGS. 2(A) and 2(B) are an illustration showing a biometric image data and a template stored in the authentication device pertaining to the embodiment.
Figure 2B:
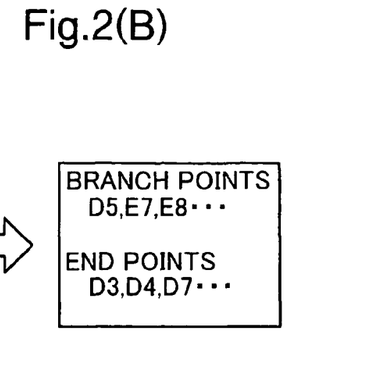

The general configuration of an authentication device pertaining to the embodiment will be described with reference to FIGS. 1 and 2. FIG. 1 is a block diagram of an authentication device 10 pertaining to the embodiment. FIG. 2 is an illustration showing a biometric image data and a template stored in the authentication device 10 pertaining to the embodiment. The biometric image data is depicted in FIG. 2(A); and the encoded data is shown in FIG. 2(B). The authentication device 10 of the embodiment is installed, for example, on a door separating a security area from the outside of the security area.

The authentication device 10 has a control unit 100, a biometric information acquirer 200, a door control unit 300, a keyboard 400, a mouse 410, and a display 500.

The control unit 100 is the center of the authentication device 10; the control unit performs authentication by comparing biometric information acquired by the biometric information acquirer 200, with previously stored authentication templates. In the present embodiment, a template refers to "information collected/registered in advance." The control unit 100 has a CPU 110, a memory 120, a hard disk 130, a door interface 150, a network interface 160, an input interface 170, and an output interface 180.

The CPU 110 is the central processing unit that controls overall operation of the authentication device 10. The CPU 110 carries out authentication. The CPU 110 executes an authentication program 134, and after performing a rotation process for the biometric information so that biometric information acquired by the biometric information acquirer 200 and an authentication template loaded from the hard disk 130 represent data for the same given insertion direction, The CPU 110 will decide whether the biometric information and the template match. The memory 120 has a nonvolatile memory ROM 122 and a volatile memory RAM 124 which allows random access. The RAM 124 is used to temporarily store data on which the CPU 110 is performing operations, for example.

The hard disk 130 stores an OS 132, an authentication program 134, and an authentication data file 136, for example. The OS 132 is the basic program for managing the basic operation of the authentication device 10. The authentication program is a program for deciding whether biometric information acquired by the biometric information acquirer 200 matches an authentication template loaded from the hard disk. The authentication data file 136 is a data file to which is written an authentication template, for example. In the present embodiment, an authentication template will register biometric information when a finger has been inserted from a prescribed direction.

The door interface 150 is an interface for the purpose of connecting the door control unit 300 with the biometric information acquirer 200 provided to the door. The network interface 160 connects the control unit 100 to a network 600. The input interface 170 connects the keyboard 400 and the mouse 410, for example. The output interface connects the display 500, for example.

The biometric information acquirer 200 measures certain characteristics of a biometric target and acquires biometric information for the purpose of performing authentication. The biometric information acquirer 200 has a light source 210; a biometric information acquisition sensor 220; an image processor 230; a controller 240; an insertion direction detection sensor 250, and an insertion aperture latch 260. In the present embodiment, for example, the light source 210 is a near-infrared light source that illuminates the biometric target with near-infrared; and the biometric information acquisition sensor 220 is a near-infrared sensor. When a finger is illuminated with near-infrared, the reduced hemoglobin present in the red blood cells in the veins of the finger will absorb the near-infrared wavelengths. As a result, by measuring transmitted light, the biometric information acquisition sensor 220 can obtain biometric target image data in which the areas of the veins appear black as shown in FIG. 2 (A).

The image processor 230 generates biometric information from image data for the biometric target which has been acquired by the biometric information acquisition sensor 220. Generation of biometric information is carried out as follows, for example. The image processor 230 converts the image data to black and white binary digital data such that areas of blood vessels appear black and other areas appear white. As shown in FIG. 2(B), the image processor 230, for example, extracts certain types of characteristic points (e.g. branch points, end points) and their locations, and generates biometric information from the types and locations of the characteristic points. Preferably, when extracting types of characteristic points and their locations, the image processor 230 will perform extraction at a lower level of accuracy than the measuring accuracy. This is so that, for example, identical biometric information can be generated from a given person being authenticated, despite slight differences in measured image data caused by changes in physical condition or the like. Alternatively, the image processor 230 may perform only black and white binary digitization of biometric image data so as to enable data processing by the CPU 110, and the CPU 110 can then use the digitized data to extract types of characteristic points and their locations. Since a general purpose image processing device can be used as the image processor 230, the authentication device 10 can be lower in cost.

In the present embodiment, types of characteristic points and their locations are employed as the biometric information, but other biological characteristics could be used as well.

The controller 240 controls operation of the light source 210, the insertion direction detection sensor 250, and the insertion aperture latch 260. The insertion direction detection sensor 250 detects the direction of insertion of the biometric target. The insertion aperture latch 260 closes and locks the insertion aperture on the side from which no biometric target is currently inserted.

The door control unit 300 controls door locking of the security door 700 on the basis of authentication results from the control unit 100. The door control unit 300 has a door lock controller 310 for controlling locking of the security door 700.

The keyboard 400 and the mouse 410 are input devices for inputting instructions to the control unit 100, for example. The display 500 is a display for the purpose of monitoring authentication results, for example.

Figure 3:
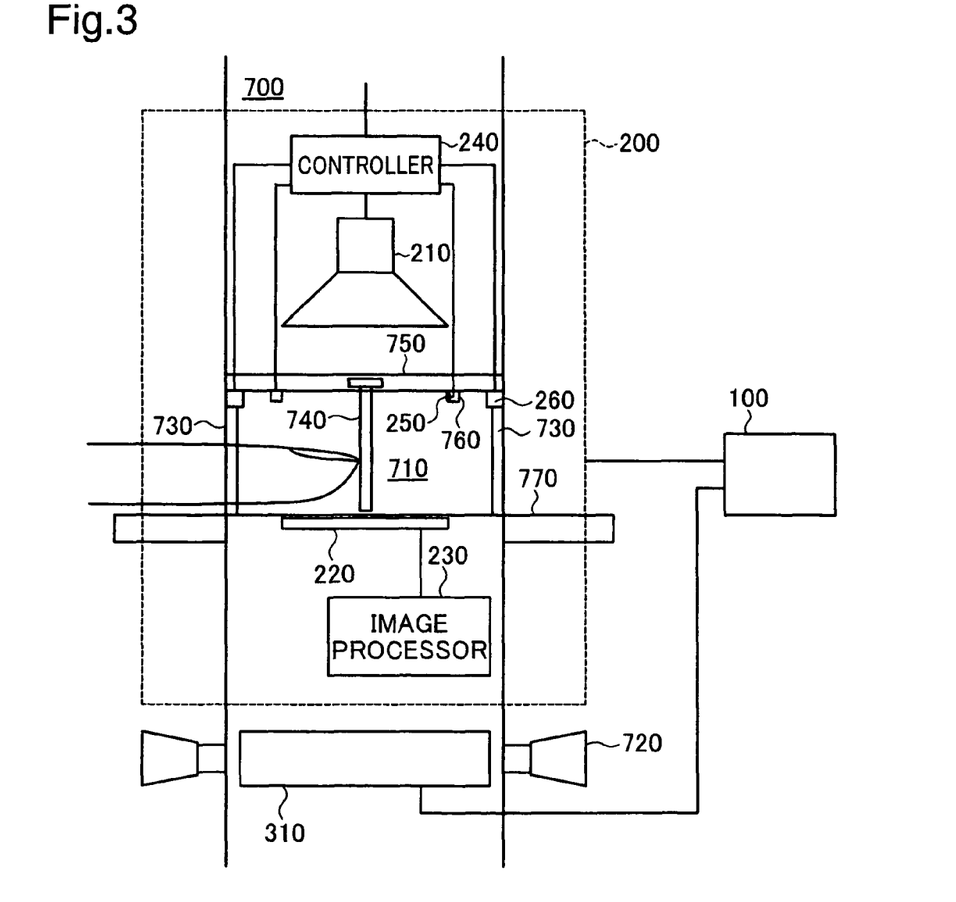
FIG. 3 is an illustration depicting in model form a cross sectional view of the structure of a security door in which a biometric information acquiring portion is installed.

The cross sectional structure of a security door in which the biometric information acquirer 200 is installed will be described with reference to FIG. 3. FIG. 3 is an illustration depicting in model form a cross sectional view of the structure of a security door 700 in which a biometric information acquirer 200 is installed.

The security door 700 includes a biometric measurement chamber 710, the light source 210, the biometric information acquisition sensor 220, the image processor 230, the controller 240; the door lock controller 310, and a door knob 720.

The biometric measurement chamber 710 is positioned so as to pass through the security door 700. The biometric measurement chamber 710 includes biometric target insertion doors 730, the insertion aperture latches 260, a slide panel 740, a rail 750, stoppers 760, and a biometric target support stage 770.

The biometric target insertion door 730 is an access door provided at the entrance of the biometric measurement chamber 710. During authentication a biometric target, such as a finger for example, is inserted from the biometric target insertion door 730. The insertion aperture latch 260 is a latch for locking the biometric target insertion door 730. The insertion aperture latch 260 includes a bolt 262; the biometric target insertion door 730 is locked by sliding the bolt 262 into the biometric target insertion door 730.

The slide panel 740 is moved by being pushed along the biometric target when the biometric target is inserted. The rail 750 supports the slide panel 740, as well as guiding the slide panel 740 as the biometric target moves. The stopper 760 stops the slide panel 740 so that the biometric target will not move beyond a given extent. Since the location of the biometric target is fixed, data shift can be minimized. As a result, comparisons can be performed more easily. The biometric target insertion direction detection sensor 250 is disposed on the stopper 760, and the direction of insertion of the finger is detected through contact of slide panel 740 against the insertion direction detection sensor 250. Once the controller 240 detects the direction of insertion of the finger, the biometric target insertion door 730 on the side from which no biometric target is inserted will lock, preventing biometric targets from being inserted simultaneously from both biometric target insertion doors 730. The biometric target support stage 770 projects out from either side of the security door and supports from below the biometric target which is inserted into the biometric measurement chamber 710. As a result, the biometric target support stage 770 can prevent the biometric target from shaking up and down during measurement. Measurement accuracy can be improved thereby.

The biometric information acquisition sensor 220 and the image processor 230 are disposed in the security door 700 below the biometric measurement chamber 710. The light source 210 and the controller 240 are disposed in the security door 700 above the biometric measurement chamber 710. Alternatively, the biometric information acquisition sensor 220 may be disposed above the biometric measurement chamber 710, and the light source 210 disposed below the biometric measurement chamber 710. Or the biometric information acquisition sensor 220 and the light source 210 may be disposed below the biometric measurement chamber 710, and biometric images acquired utilizing reflected light from the biometric target.

Figure 4:
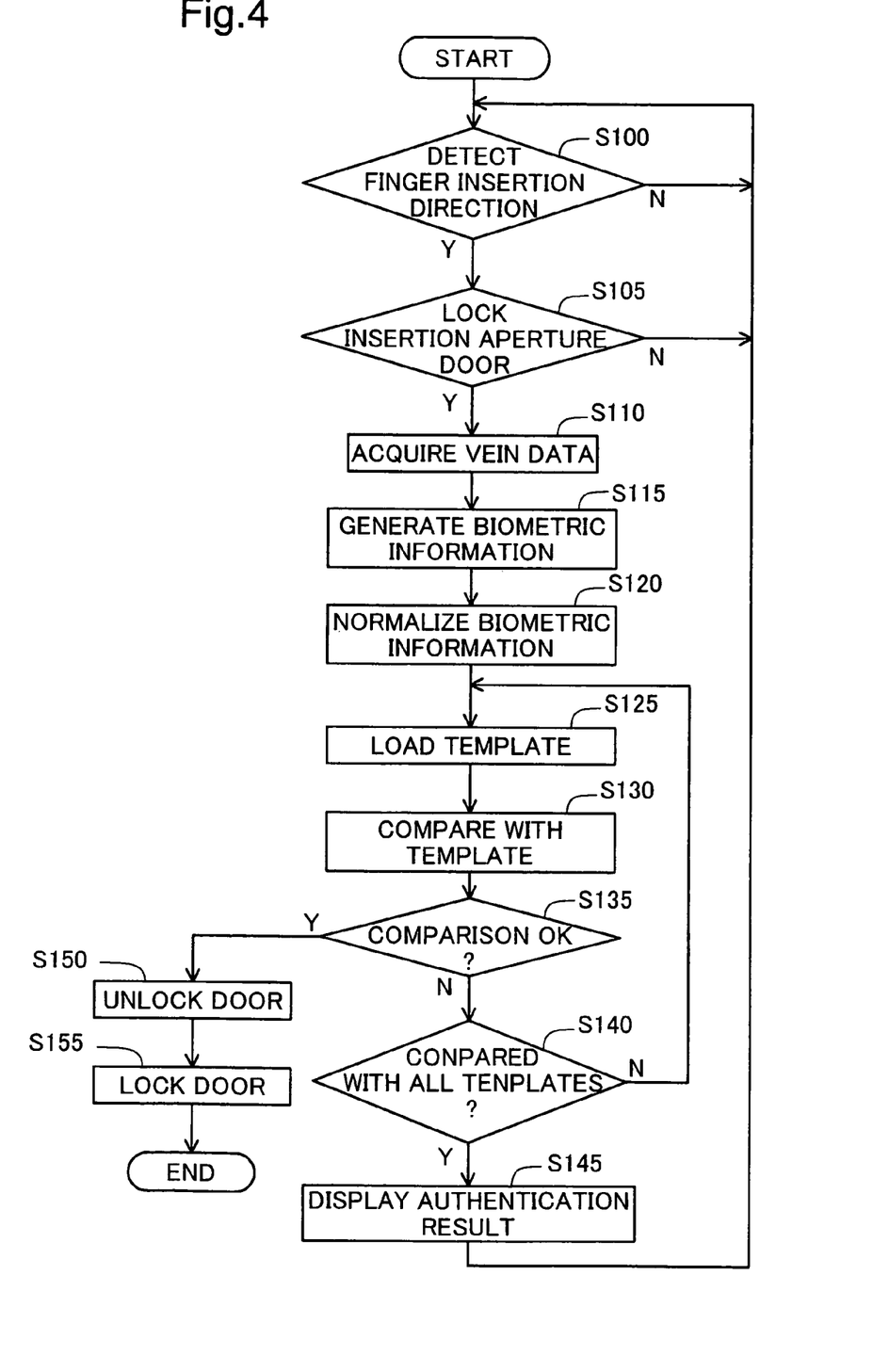
FIG. 4 is a flowchart illustrating operation of an authentication device.
Figure 5:
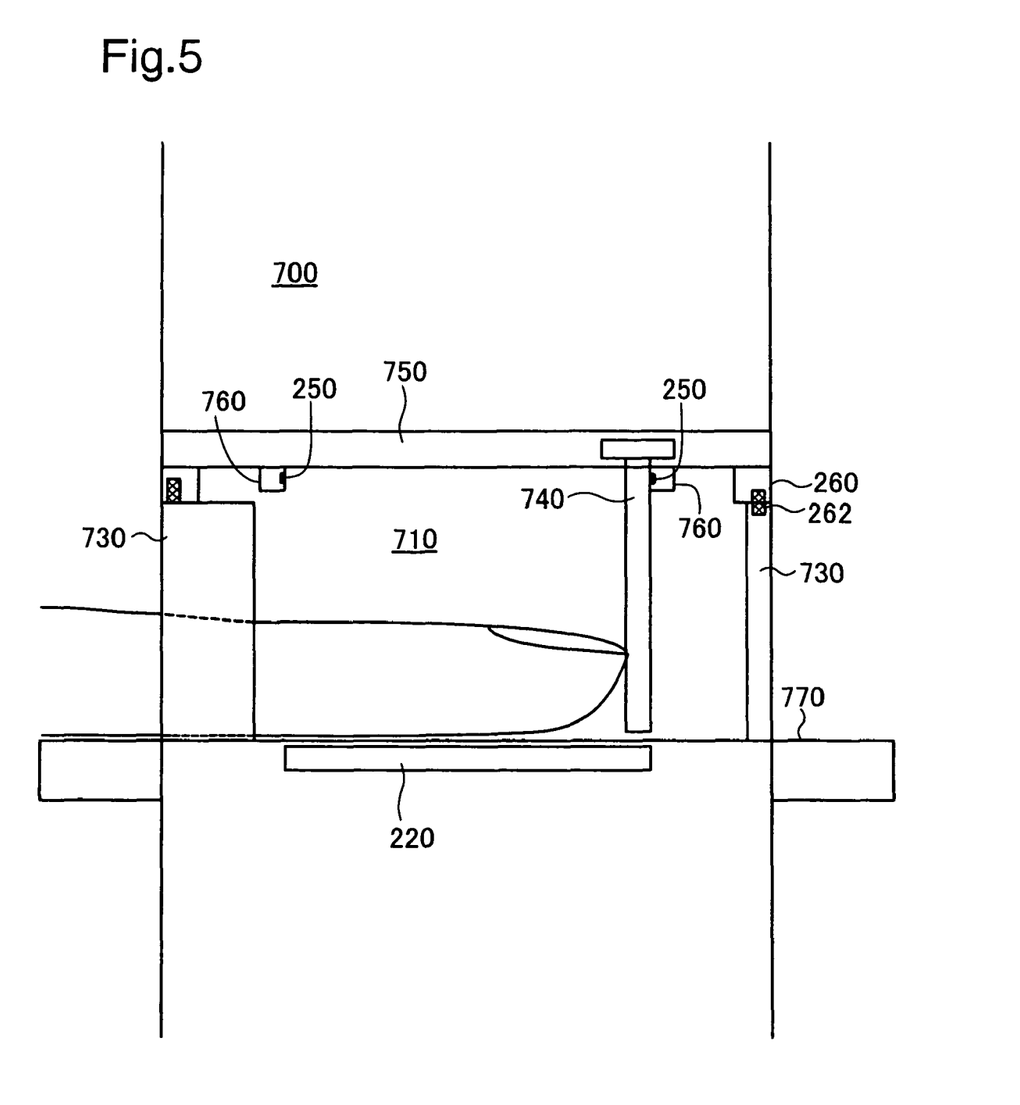
FIG. 5 is an illustration depicting in model form insertion of a finger into the authentication device.
Figure 6A:
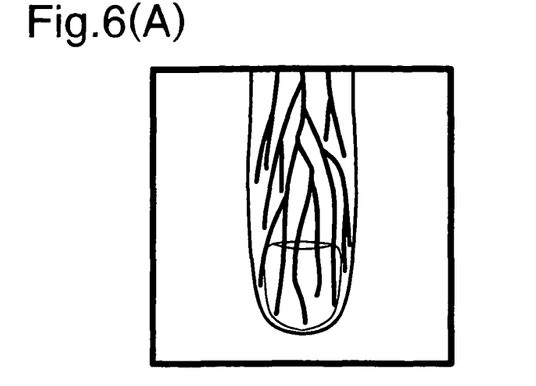
FIGS. 6(A) to 6(C) are an illustration depicting in model form processing of image data during authentication.
Figure 6B:
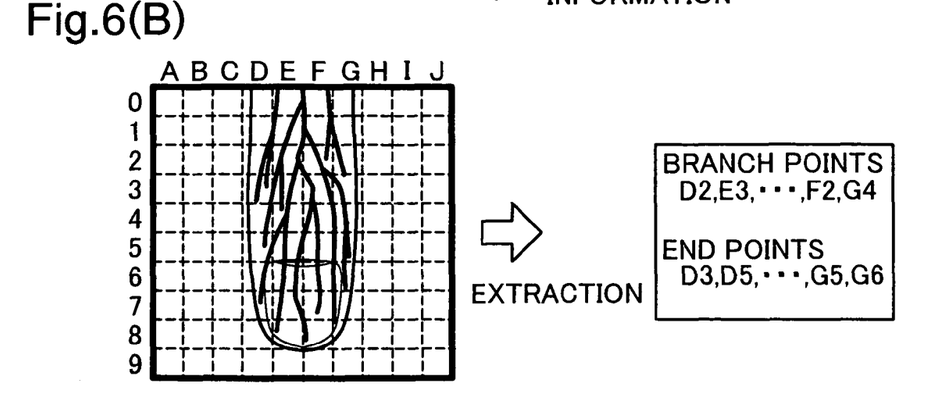
Figure 6C:
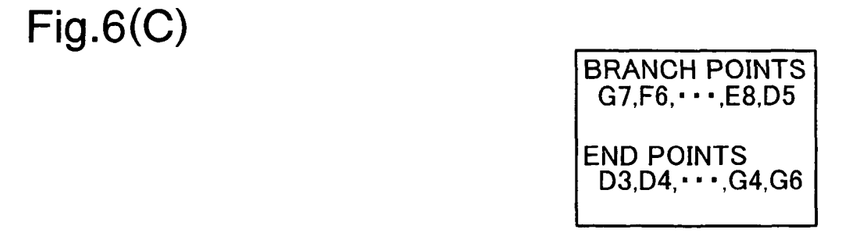

Operation of the authentication device 10 will be described referring to FIGS. 4 through 6. FIG. 4 is a flowchart illustrating operation of the authentication device 10. FIG. 5 is an illustration depicting in model form insertion of a finger into the authentication device 10. FIG. 6 is an illustration depicting in model form processing of image data during authentication.

The person who is receiving authentication (hereinafter "authentication subject") inserts a finger through the biometric target insertion door 730 of the authentication device 10. The authentication subject pushes the slide panel 740 with the fingertip until the slide panel 740 comes to a stop against the stopper 760. The location at which the slide panel 740 comes to a stop is the finger measurement location. The insertion direction detection sensor 250 detects the direction of insertion of the finger (Step S100).

Once the controller 240 detects the direction of insertion of the finger, the biometric target insertion door 730 on the side opposite from the finger insertion side is locked (Step S105). The locked door prevents a biometric target from being inserted through the other biometric target insertion door 730.

The biometric information acquisition sensor 220 now acquires image data of the biometric target (Step S110). The acquired image data is shown in FIG. 6(A). The image processor 230 generates biometric information from the image data (Step S115). The biometric information generated from the image data is depicted in FIG. 6(B).

The CPU 110 then performs conversion of the biometric information, so that the biometric information generated by the image processor 230 and the authentication template stored on the hard disk represent data for the same insertion direction (Step S120). The CPU 110 detects the direction of insertion of the finger through a signal from the insertion direction detection sensor. During authentication, in the event that the finger has been inserted from a different direction than the access direction at the time of acquisition of the authentication template, the CPU 110 will rotate the biometric information or the authentication template to align the direction of finger insertion, in order to enable comparison of the biometric information to the authentication template. For example, in the present embodiment, the CPU 110 performs the rotation process on the generated biometric information. The biometric information subsequent to the rotation process is shown in FIG. 6(C). It is preferable that the CPU 110 perform the rotation process on the acquired biometric information, since a single rotation process will suffice thereby. While in the present embodiment the CPU 110 performs the rotation process on the biometric information, The CPU 110 could instead perform the rotation process on the authentication template. In the present embodiment, the act of performing a rotation process on the data of either the biometric information or the template so that the direction of insertion of the biometric information is the same as the direction of insertion at the time the template was measured is termed a normalizing process. In the present embodiment, the normalizing process is carried out after the biometric information has been generated; however, the image processor 230 could instead perform the process of rotating the image data of the acquired biometric target prior to creation of the biometric information (Step S115). Since the image data rotation process is carried out by the image processor 230, the load on the CPU 110 can be reduced. The CPU 110 writes the normalized biometric information to the RAM 124. In the event that the direction of insertion of the finger during authentication and the direction of insertion of the finger at the time of authentication template acquisition are the same, the CPU 110 will write the biometric information to the RAM 124 without performing a normalizing process on the biometric information. This is because there is no need to perform the normalizing process, since the direction of insertion of the finger during authentication and the direction of insertion of the finger at the time of authentication template acquisition are the same.

The CPU 110 loads an authentication template from the hard disk 130 (Step S125). The CPU 110 then performs a check by comparing the biometric information written to the RAM 124 with the authentication template (Step S130).

In the event that the biometric information written to the RAM 124 and the authentication template do not match (Step S135, N), the CPU 110 will decide whether comparisons have been made with all of the authentication templates registered in the hard disk (Step S140). If comparisons have not been made with all of the authentication templates (Step S140, N), the CPU 110 will load another authentication template (Step S125) and perform a comparison with the biometric information in the above manner. If comparisons have been made with all of the authentication templates (Step S140, Y), the CPU 110 will display the authentication results (Step S145). In the event that there is no match between the biometric information written to the RAM 124 and the authentication templates, the CPU 110 will indicate the authentication results by illuminating a warning lamp (not shown) or issuing a warning message. After displaying the authentication results, the CPU 110 awaits the next authentication request (Step S100).

In the event of a match between the biometric information written to the RAM 124 and an authentication template, the CPU 110 will instruct the door lock controller portion 310 to unlock the lock of the security door 700 (Step S145). When the security door 700 is again shut after being opened, the CPU 110 will instruct the door lock controller 310 to lock the lock of the security door 700 (Step S150). In preferred practice, in the event that the security door 700 is not opened within a prescribed period of time after the door lock controller 310 has unlocked the lock of the security door 700, the CPU 110 will instruct the door lock controller 310 to lock the lock of the security door 700. This is because leaving the door unlocked indefinitely is undesirable from a security standpoint.

According to the present embodiment, the CPU 110 carries out authentication after performing a rotation process on the acquired biometric information so that the access direction at the time of biometric information acquisition matches the access direction at the time the authentication template was acquired. As a result, authentication requests for biometric targets from multiple directions can be authenticated by a single authentication device.

Also, according to the present embodiment, since a single biometric information acquirer 200 suffices, the authentication device 10 can be lower in cost. Moreover, since there is no need for an authentication device rotation mechanism, the authentication device 10 can be smaller.

In the present embodiment, the biometric information acquirer 200 is disposed in the security door 700, but the biometric information acquirer 200 could be installed in any area accessible from either side of the security door 700. For example, the biometric information acquirer 200 could be situated in the wall in proximity to the security door 700.

In the present embodiment, the blood vessel pattern of the veins of the finger is measured, but it would be possible to instead measure the fingerprint, the shape of the palm, or the blood vessel pattern of the palm, for example. Also, while near-infrared is used for measurement here, some other measuring method could be employed instead. For example, where the fingerprint is being measured, it would be acceptable to measure capacitance.

Figure 7:
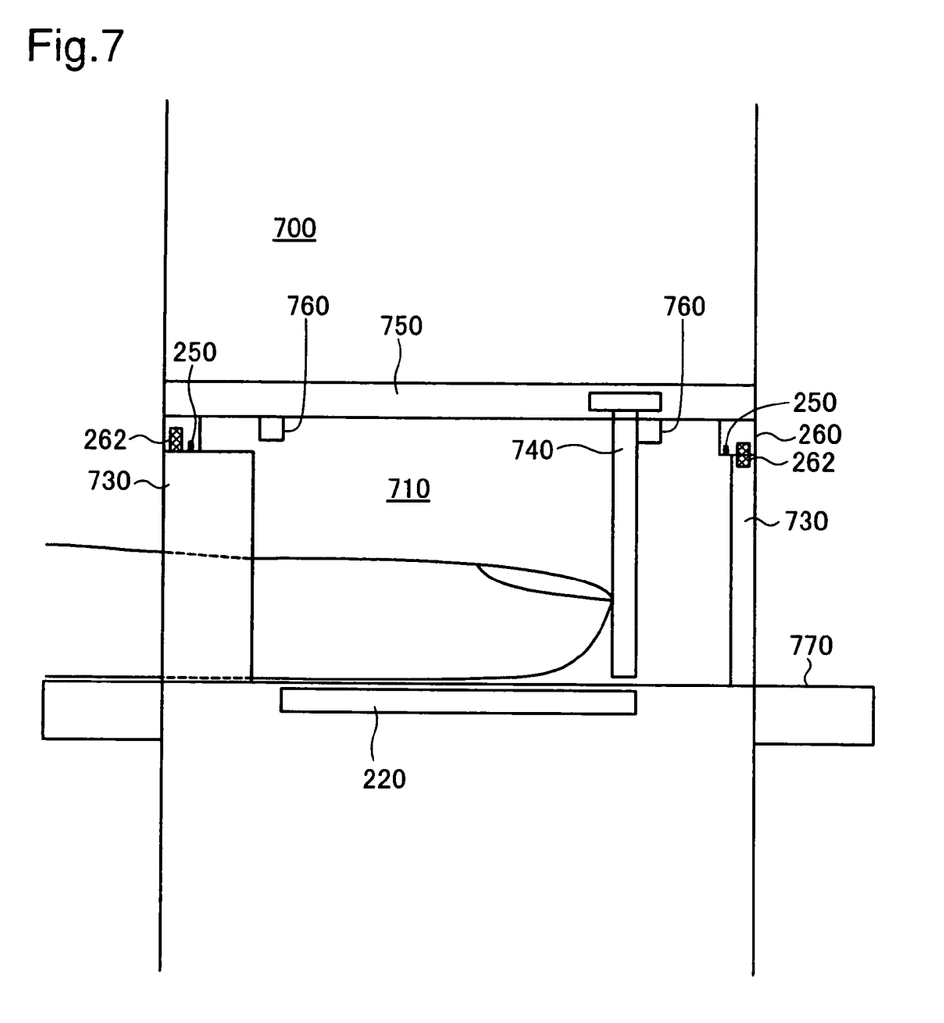
FIG. 7 is an illustration depicting in model form insertion of a finger into an authentication device pertaining to a modification example.
Figure 8A:
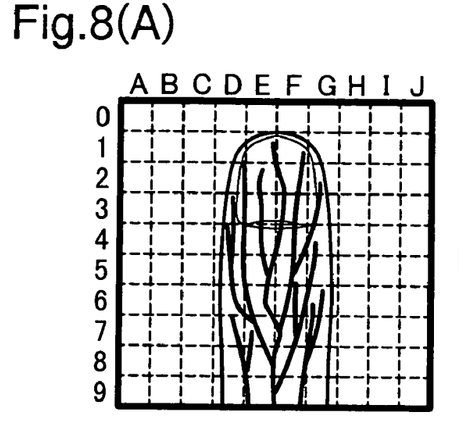
FIGS. 8(A) to 8(D) are an illustration depicting in model form image data at the time of template creation, and authentication templates stored in an authentication data file.
Figure 8B:
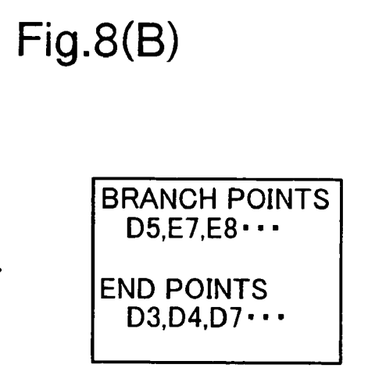
Figure 8C:
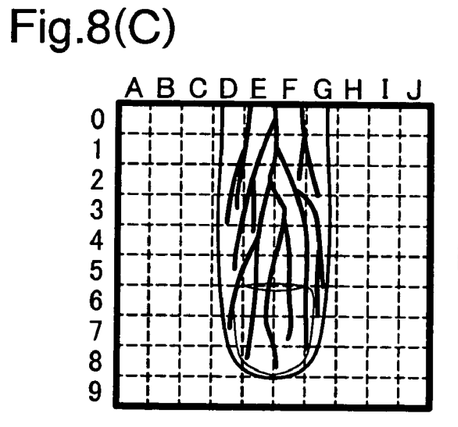
Figure 8D:
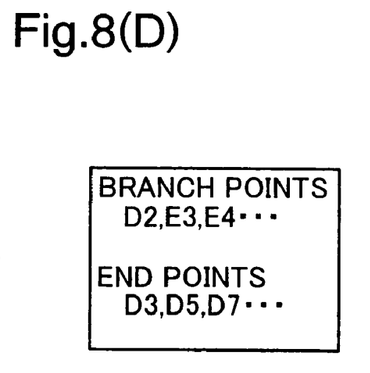

In the present embodiment, the insertion direction detection sensors 250 for detecting the finger insertion direction are disposed on the stoppers 760, but the insertion direction detection sensors 250 could instead be disposed at locations adjacent to the biometric target insertion doors 730, as shown in FIG. 7. FIG. 7 is an illustration depicting in model form insertion of a finger into an authentication device pertaining to a modification example. The authentication device 10 pertaining to the modification example is furnished with insertion direction detection sensors 250 at locations adjacent to the biometric target insertion doors 730. As a result, opening and closing of the biometric target insertion doors 730 can be detected to enable detection of the finger insertion direction.

In the present embodiment, insertion of a biometric target into the biometric measurement chamber 710 from the other direction is prevented by locking the biometric target insertion door 730 on that side, but it would be possible to instead lock the slide panel 740 so that the biometric target does not move.

In the present embodiment, as for an authentication template for a single biometric target, templates data at the time of insertion of the biometric target from one direction are stored; however, multiple authentication templates may be stored for different insertion directions of the biometric target, as shown in FIG. 8. FIG. 8 is an illustration depicting in model form image data at the time of template creation, and authentication templates stored in the authentication data file 136. For example, FIG. 8(A) and FIG. 8(B) respectively depict image data when the finger was inserted from the left side of the security door 700 shown in FIG. 3 and the template generated by encoding thereof; while FIG. 8(C) and FIG. 8(D) respectively depict image data when the finger was inserted from the right side of the security door 700 shown in FIG. 3 and the template generated by an encoding process thereof. Since the authentication data file 136 has stored therein authentication templates created at the time of insertion of the biometric target from either biometric target insertion aperture, the CPU 110 does not need to perform a reversal process of measured image data, or a normalizing process of the data subsequent to encoding of measured image data. Consequently, the data processing time can be shorter. Typically, data processing is time consuming in the case of angles other than 90 degrees or 180 degrees, and it is therefore useful to save multiple authentication templates for each different insertion direction of the biometric target. Also, since the biometric target insertion direction is detected, the authentication templates for comparison need be only authentication templates created when the biometric target is inserted in the same direction. Consequently, there is no change in the number of authentication templates for comparison by the CPU 110. That is, to the extent that data processing time is shorter, authentication time can be shorter as well.

In the present embodiment, the insertion direction detection sensor 250 is provided for detection of biometric target insertion direction; however, the insertion direction detection sensor 250 may be dispensed with, instead storing multiple authentication templates for each different insertion direction of biometric targets. Since the authentication device 10 will have a stored corresponding authentication template regardless of which direction a biometric target is inserted, the authentication subject can be authenticated even in the absence of the insertion direction detection sensor 250 for detecting biometric target insertion direction. Since it is no longer necessary to provide the insertion direction detection sensor 250, manufacturing cost can be lower.

While the present invention has been shown hereinabove in terms of certain preferred embodiments, the embodiments of the invention herein are intended to aid in understanding of the invention and not for the purpose of limiting the invention. Various modifications and improvements to the present invention can be made without departing from the spirit and scope of the invention as set forth in the appended claims, and these shall be included among equivalents of the invention.

What is claimed is:

1. An authentication device, disposed at a security door, enabling access from multiple directions, comprising:
   a chamber in which a biometric target is inserted;
   two chamber doors disposed at opposite of the chamber;
   a slide panel capable of movement when pushed by a biometric target;
   a detector for detecting a direction of access by the biometric target responsive to movement of the slide panel;
   a door lock for locking one of the chamber doors after the detector detects a direction of access by the biometric target when the biometric target is inserted from the other of the chamber doors;
   a biometric information acquirer for acquiring biometric information from the biometric target that is inserted in the chamber;
   a memory for storing in advance therein a template for authentication; and
   an authenticator for authenticating the biometric target on the basis of the detected access direction information of the biometric target, biometric information acquired from the biometric target, and the template.

2. The authentication device according to claim 1, wherein the authenticator is for performing authentication using access direction information for the biometric target by carrying out conversion of acquired biometric information or the template, such that access direction at the time of acquisition of the template and access direction of the biometric target at the time of authentication are brought into correspondence.

3. The authentication device according to claim 1, wherein:
   the memory is for storing multiple template information depending on access direction; and
   the authenticator is for authenticating the biometric target using a template of an access direction corresponding to the access direction of the biometric target, read from the memory.

4. The authentication device according to claim 1, further comprising an immobilizer for immobilizing the biometric target at the measurement location.

5. The authentication device according to claim 2, further comprising an immobilizer for immobilizing the biometric target at the measurement location.

6. The authentication device according to claim 3, further comprising an immobilizer for immobilizing the biometric target at the measurement location.

7. The authentication device according to claim 4, wherein the detector is disposed in the immobilizer.

8. The authentication device according to claim 5, wherein the detector is disposed in the immobilizer.

9. The authentication device according to claim 6, wherein the detector is disposed in the immobilizer.

10. An authentication device, disposed at a security door, enabling access from multiple directions, comprising:
    a chamber in which a biometric target is inserted;
    two chamber doors disposed at opposite sides of the chamber;
    a slide panel capable of movement when pushed by a biometric target;
    a detector for detecting a direction of access by the biometric target responsive to movement of the slide panel;
    a door lock for locking one of the chamber doors after the detector detects a direction of access by the biometric target when the biometric target is inserted from the other of the chamber doors;
    a biometric information acquirer for acquiring biometric information from a biometric target;
    a memory for storing in advance therein multiple templates for authentication purposes depending on access direction; and
    an authenticator for authenticating the biometric target on the basis of comparison of biometric information acquired from the biometric target with the multiple templates for authentication purposes stored in the memory.

* * * * *